US008744814B2

(12) United States Patent
Putkinen et al.

(10) Patent No.: US 8,744,814 B2
(45) Date of Patent: Jun. 3, 2014

(54) ARRANGEMENT AND METHOD FOR PROTECTING A POWER SUPPLY CIRCUIT COMPONENT

(75) Inventors: Esa Putkinen, Hyvinkää (FI); Hannu Lehtinen, Numminen (FI)

(73) Assignee: Kone Corporation, Helsinki (FI)

( * ) Notice: Subject to any disclaimer, the term of this patent is extended or adjusted under 35 U.S.C. 154(b) by 225 days.

(21) Appl. No.: 13/155,167

(22) Filed: Jun. 7, 2011

(65) Prior Publication Data

US 2011/0235226 A1 Sep. 29, 2011

Related U.S. Application Data

(63) Continuation of application No. PCT/FI2009/000101, filed on Dec. 3, 2009.

(30) Foreign Application Priority Data

Dec. 19, 2008 (FI) ..................................... 20080667

(51) Int. Cl.
*G06F 17/10* (2006.01)

(52) U.S. Cl.
USPC ............................................................ 703/2

(58) Field of Classification Search
USPC ............................................................ 703/2
See application file for complete search history.

(56) References Cited

U.S. PATENT DOCUMENTS

| | | | | |
|---|---|---|---|---|
| 3,638,157 | A | 1/1972 | Kruzic | |
| 5,867,809 | A | 2/1999 | Soga et al. | |
| 6,600,641 | B2 * | 7/2003 | Oglesbee et al. | 361/103 |
| 7,773,360 | B2 * | 8/2010 | O'Leary et al. | 361/104 |

FOREIGN PATENT DOCUMENTS

| | | | |
|---|---|---|---|
| DE | 41 10 335 | A1 | 10/1992 |
| EP | 2 031 948 | A2 | 3/2009 |
| JP | 11-356036 | A | 12/1999 |
| JP | 2002-279880 | A | 9/2002 |

OTHER PUBLICATIONS

Fuse Technology: sales brochure (Cooper Bussman); 2005; pp. 1-5.*
Bussman: High Speed Fuses Applications Guide; application notes for customers; Cooper Bussman; 2002; 53 pages.*

(Continued)

*Primary Examiner* — Hugh Jones
(74) *Attorney, Agent, or Firm* — Birch, Stewart, Kolasch & Birch, LLP.

(57) ABSTRACT

The invention relates to an arrangement for protecting a component in a power supply circuit. The arrangement comprises determination of an electric quantity constituting a load on the component, which electric quantity constituting a load on the component is determined repeatedly while the component is exposed to the load. The arrangement also comprises estimation of instantaneous load capacity of the component, which estimation of instantaneous load capacity is performed using a limitation criterion set for the load capacity of the component. This limitation criterion indicates the longest possible operating time of the component under a given loading condition. For the limitation criterion, a representation with respect to the electric quantity constituting a load on the component is provided, and a limitation criterion corresponding to the defined electric quantity constituting a load on the component is derived repeatedly from the said representation while the component is exposed to the load. The estimate of instantaneous load capacity of the component is thus determined on the basis of both the limitation criterion defined substantially at the estimation instant and the limitation criteria defined before this.

8 Claims, 4 Drawing Sheets

(56) References Cited

OTHER PUBLICATIONS

Figure 1A:
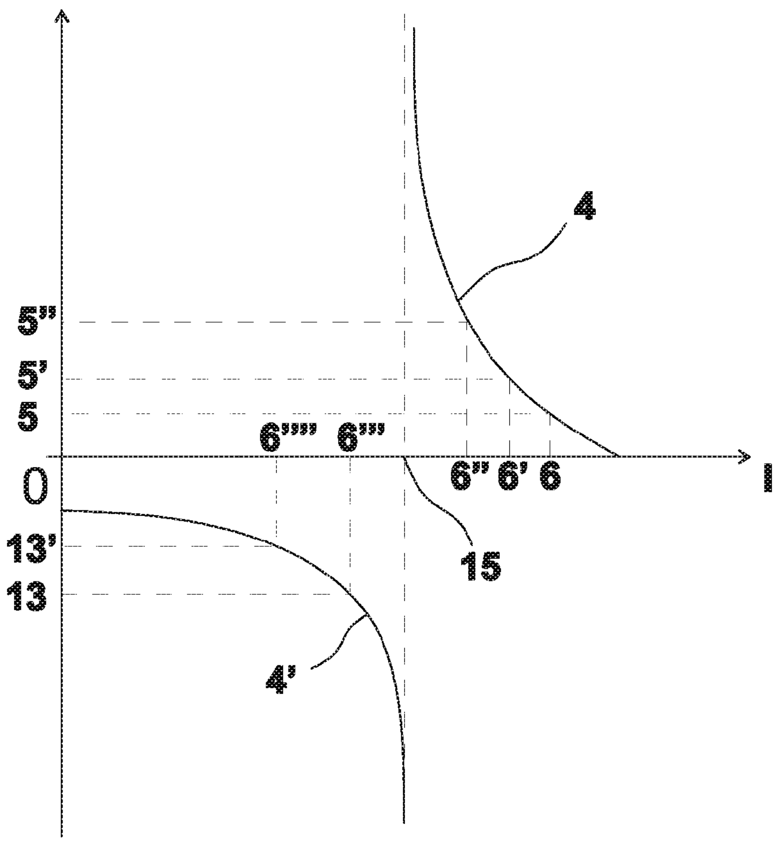

Meng: Reliability concept for electric fuses; IEE Proc-Sci. Meas. Technol.. vol. 144. No. 2, Mar. 1997; pp. 87-92.*
Meng: Lifetime Predictions of Miniature Fuses and Semiconductor Protection Fuses (PhD Thesis); 1995; Eindhoven University of Technology; 136 pages.*
Batchelor et al.: Time-current characteristic of miniature zinc-element electric fuses for automotive applications; IEE Proc.-Sci. Meas Technol., vol. 146, No. 4. Jul. 1999; pp. 210-216.*
Williams: Fuses and Protective Relays in Newnes Electrical Power Engineer's Handbook (Second Edition), 2005, pp. 219-245.*

* cited by examiner

ARRANGEMENT AND METHOD FOR PROTECTING A POWER SUPPLY CIRCUIT COMPONENT

This application is a Continuation of PCT International Application No. PCT/FI2009/000101 filed on Dec. 3, 2009, which claims the benefit of Patent Application No. 20080667 filed in Finland, on Dec. 19, 2008. The entire contents of all of the above applications is hereby incorporated by reference into the present application.

The present invention relates to a transportation system, an elevator system, and a method as defined in the claims.

The instantaneous electric power flowing in a power supply system varies. For instance, the power taken from the electric network of a building and likewise the power possibly returned into the electric network varies with time. However, an electricity supply connection is usually designed according to the highest power requirement, and therefore the variation in power also affects the costs of power supply to the building. Many other components in different power supply systems are also designed according to the highest power to be handled.

For example, in an elevator system power is supplied from an electricity network to the elevator motor in order to move the elevator car. The supply of power to the motor is generally implemented using a frequency converter. When the elevator car is braked by the motor, power is also returned from the motor to the frequency converter, from which it is often transferred further back into the electricity network. The instantaneous power supplied to the motor or returning from the motor is generally greater during acceleration and braking of an elevator system than during constant-speed operation.

Publication U.S. Pat. No. 4,545,464 proposes an elevator system in which braking power returning from the motor is fed into the electricity supply of the elevator system.

To solve the problems referred to above as well as those discussed in the below description of the invention, a novel method for handling temporally varying power in a power supply system is disclosed as an invention.

Embodiments of the invention are defined by what is disclosed in the claims. Inventive embodiments are also presented in the description part of the present application. The inventive content disclosed in the application can also be defined in other ways than is done in the claims below. The inventive content may also consist of several separate inventions, especially if the invention is considered in the light of explicit or implicit sub-tasks or with respect to advantages or sets of advantages achieved. In this case, some of the attributes contained in the claims below may be superfluous from the point of view of separate inventive concepts.

In the invention, "electric quantity constituting a load on a component" refers e.g. to a voltage across the poles of the component, to a current flowing through the component, and also to the frequency and/or rate of change of the current and/or voltage. The electric quantity can be defined repeatedly e.g. by determining the instantaneous value of the quantity, by calculating the mean value or root-mean-square value of the quantity between the instants of determination, or by interpolating the value of the electric quantity.

"Power supply circuit" in the invention refers to a circuit consisting of electric devices, components and wirings through which electricity is supplied to the system.

The advantages achieved by the invention include at least one of the following:

The arrangement of the invention comprises determination of an electric quantity constituting a load on a component, which electric quantity constituting a load on the component is determined repeatedly while the component is exposed to the load, said arrangement comprising estimation of instantaneous load capacity of the component, which estimation of instantaneous load capacity is performed using a limitation criterion set for the load capacity of the component.

This limitation criterion indicates the longest possible operating time of the component under a given loading condition. For the limitation criterion, a representation with respect to the electric quantity constituting a load on the component is prepared, and a limitation criterion corresponding to the defined electric quantity constituting a load on the component is derived repeatedly from the said diagram while the component is exposed to the load. The estimate of instantaneous load capacity of the component is determined on the basis of both the limitation criterion defined substantially at the instant of estimation and the limitation criteria defined before this.

The limitation criterion may be represented e.g. as a function including the said electric quantity as a variable; on the other hand, the limitation criterion may be represented e.g. in tabular or graphic form with respect to the said electric quantity. As a limitation criterion, it is possible to use e.g. the longest total time allowed for overloading of the component, or the recovery time required as a whole for recovery from overloading. The limitation criterion may be represented linearly or non-linearly with respect to the electric quantity constituting a load on the component. The limitation criterion may be defined repeatedly; likewise, the instantaneous load capacity of the component may be estimated from a repeatedly defined limitation criterion, in which case the loading history of the component is also taken into account in the estimation of instantaneous load capacity of the component. Thus, as the estimation of instantaneous load capacity of the component becomes more accurate, the protection of the component against overloading is also improved. Due to the improved overload protection, the component can momentarily be subjected to a load exceeding the nominal load. This is useful especially in systems where the component is exposed to a temporally varying load, because in this case the component need not necessarily be rated for the highest instantaneous load, so it is possible to use components of a lower power handling capacity. The components to be protected may include e.g. so-called slow fuses, or e.g. different power semiconductors, resistors, inductors, capacitors and transformers. In the case of a slow fuse, heating-up is reduced by increasing the heating-up time constant of the component, e.g. by adding sand or some other heat-retarding material around the fuse wire.

In an embodiment of the invention, the arrangement comprises a representation of the time to failure of the component, wherein the time to failure is represented with respect to an electric quantity constituting a load on the component. "Time to failure" refers to the total time that the component will typically tolerate a given loading, so that the loading would finally lead to failure of the component. The electric quantity constituting a load on the component and the corresponding time to failure are defined repeatedly, and the estimate of instantaneous load capacity of the component is determined on the basis of both the time to failure defined substantially at the moment of estimation and the times to failure defined previously. The protection of the component against overloading is thus improved.

According to the invention, the load capacity of the power supply circuit component to be protected can be determined without separate measurement of the temperature of the component. Thus, as the number of temperature sensors is reduced, the overall system is simplified and the reliability of the system improved.

Different systems subject to varying loads include e.g. transportation systems, such as a passenger or freight elevator system, escalator system, passenger conveyor system, roller elevator system, crane system, vehicle system or a conveyor system for conveying goods and/or raw materials. The aforesaid elevator system may be a system with or without machine room. The elevator system may also be a counterweighted or counterweightless system.

The transportation system of the invention comprises an arrangement for protecting a fuse in the power supply to the transportation system, said arrangement comprising determination of the current flowing through the fuse, which fuse current is determined repeatedly while the fuse is exposed to a load. The arrangement also comprises estimation of instantaneous load capacity of the fuse, which estimation of instantaneous load capacity is performed using a limitation criterion set for the load capacity of the fuse. This limitation criterion indicates the longest possible operating time of the fuse under a given loading condition. For the limitation criterion, a representation with respect to the fuse current is provided, and a limitation criterion corresponding to the defined fuse current is derived repeatedly from the said representation while the fuse is exposed to a load. The estimate of instantaneous load capacity of the fuse is thus determined on the basis of both the limitation criterion defined substantially at the instant of estimation and the limitation criteria defined before this. The fuse current is adapted to be limited to a given boundary current value, and this boundary current value is determined according to the estimated load capacity of the fuse. In an embodiment of the invention, power exceeding the limited current handling capacity of the fuse is adapted to be consumed in a resistor connected to the power supply circuit of the transportation system.

When the fuse in the power supply to the transportation system is thus protected by the method of the invention, a fuse rating below the required instantaneous maximum loading can be selected for the building. As the fuse rating has a substantial effect on the costs of power supply to the building, the invention thus makes it possible to achieve significant savings.

In an embodiment of the invention, the power supply circuit comprises a control function, and this power supply control function is adapted to limit the current flowing through a component in the power supply circuit to a given boundary current value, said boundary current value being determined according to an estimated instantaneous load capacity of the component. The boundary current value can be varied in accordance with the instantaneous estimate of the load capacity of the component. For example, the current flowing in the power supply circuit of a transportation system can thus be limited to the boundary current value allowed at a given instant of time, and the boundary value can be varied in response to load capacity and/or to a change in load capacity. This also allows the component to be subjected to an instantaneous load exceeding the nominal load.

In an embodiment of the invention, the estimation of load capacity of the component is implemented using a component recovery time corresponding to the value of the electric quantity constituting a load on the component. The reason for this is that, when the loading on the component is reduced to a level below a given boundary loading value, the component begins to recover. The component temperature starts falling at a rate determined by the thermal time constant, and the recovery takes place the faster the lower is the loading during recovery. Therefore, as the component is recovering/cooling down, the estimate of instantaneous load capacity of the component starts rising correspondingly, and thus the determination of component recovery time can be utilized to achieve a more accurate estimate of the instantaneous value of the load capacity of the component. According to the invention, the recovery time is so defined that it corresponds to the total time after which the component will be considered as having completely recovered from the strain preceding recovery if the electric quantity constituting a load on the component remains constant throughout the recovery period.

According to one or more embodiments of the invention, the estimation of instantaneous load capacity is performed using additionally a second limitation criterion set for the load capacity of the component, this second limitation criterion indicating the recovery time of the component under a given loading condition. The recovery of the component can thus be determined, and when the component is recovering, its momentary overload capacity increases.

An elevator system according to the invention comprises one of the above-introduced arrangements for protecting a component in the power supply circuit of the elevator system.

According to one or more embodiments of the invention, data indicating the instantaneous load capacity of the power supply circuit component is arranged to be transmitted to an elevator maintenance center. The data indicating the instantaneous load capacity of the power supply circuit component can thus also be used e.g. for remote control and/or maintenance of the elevator.

Figure 1B:
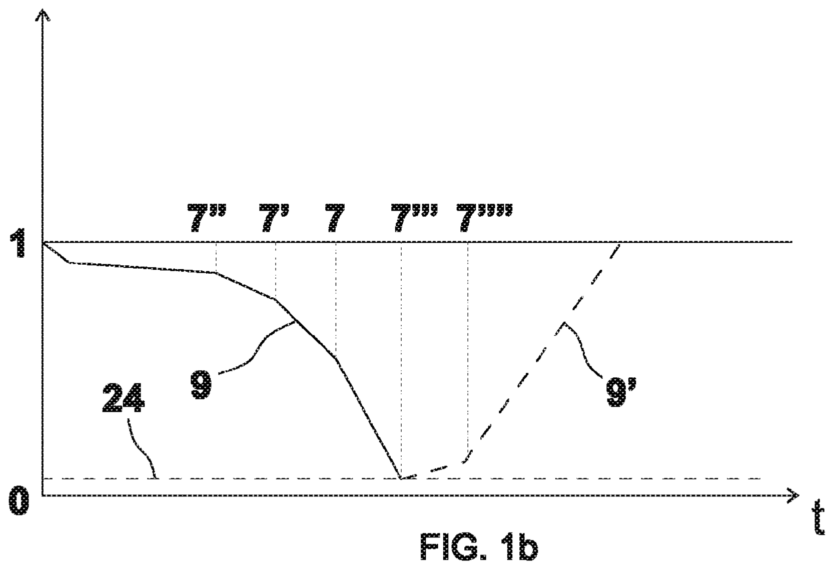
Figure 2:
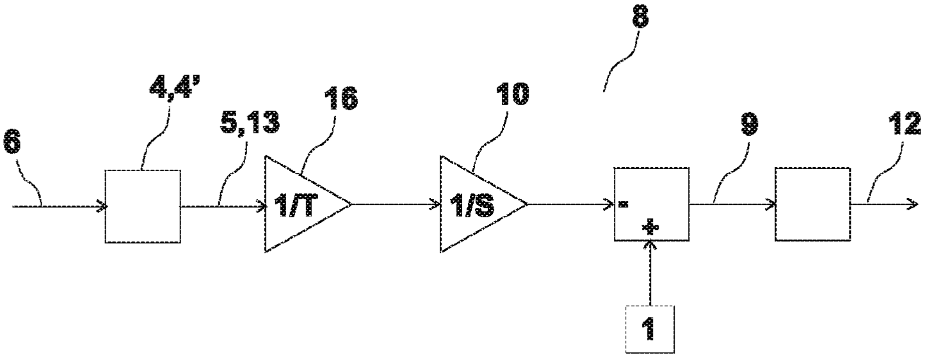
Figure 3:
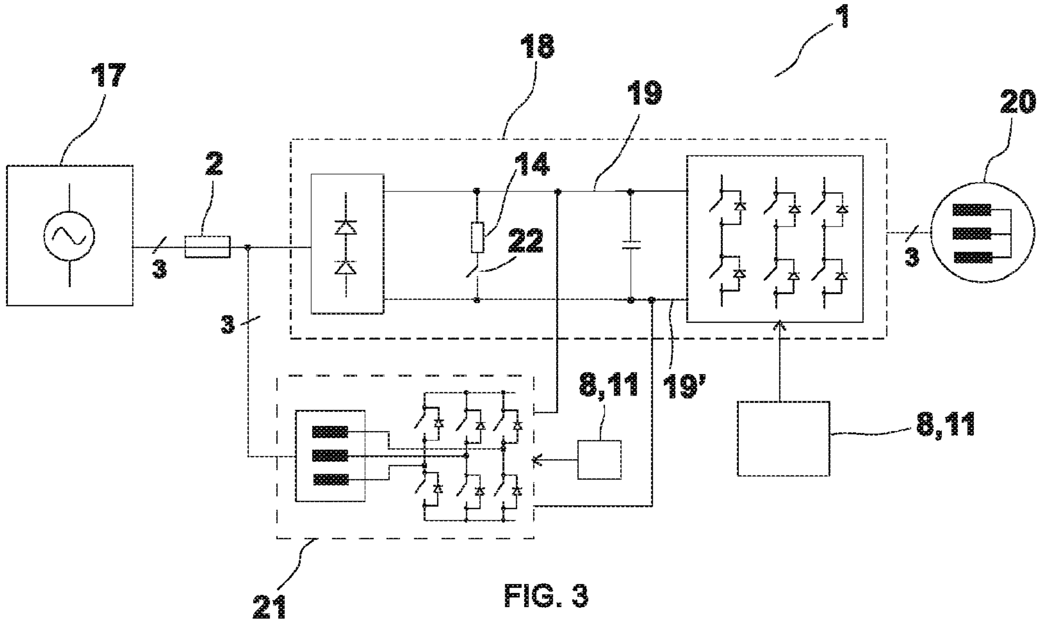
Figure 4:
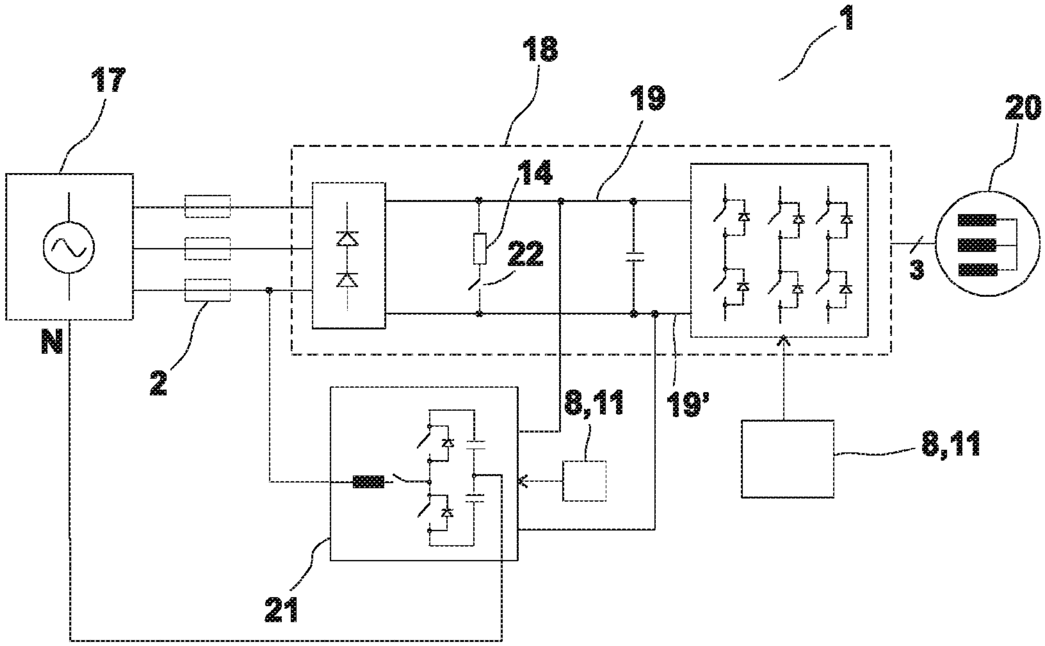
Figure 6:
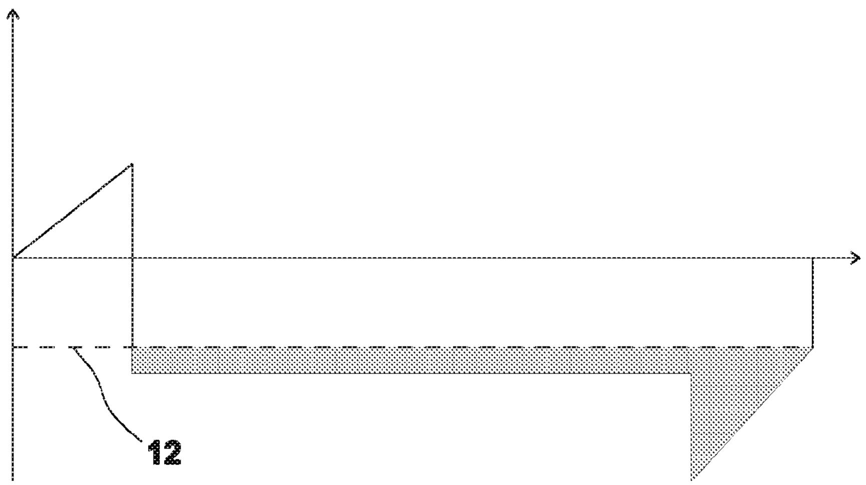
Figure 5:
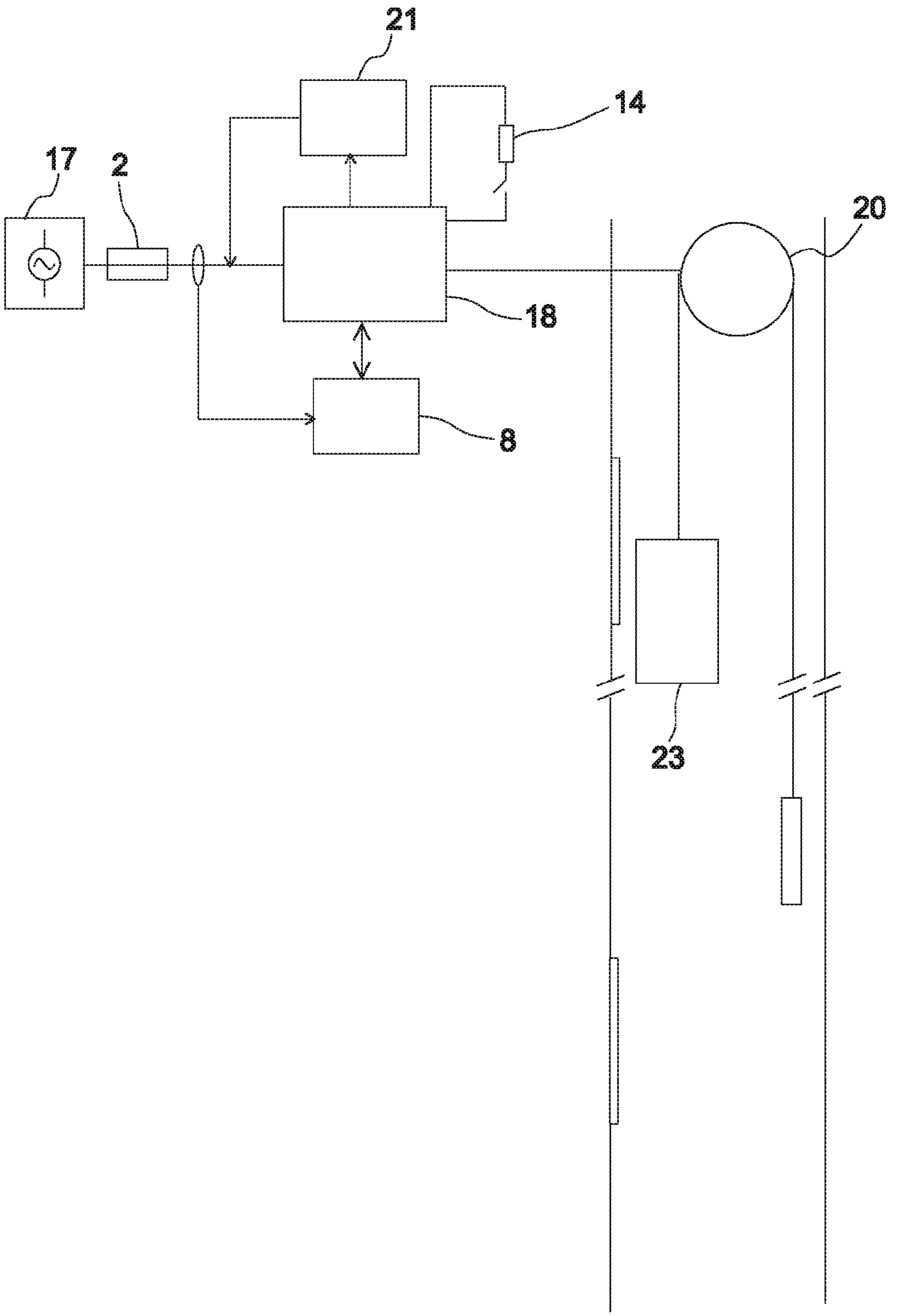

In the following, the invention will be described in detail by referring to embodiment examples and the attached drawings, wherein FIG. 1*a* is a representation of component failure time and component recovery time according to the invention FIG. 1*b* represents the instantaneous load capacity of a component in an embodiment of the invention FIG. 2 is a block diagram representing estimation of component load capacity according to the invention FIG. 3 represents a power supply arrangement according to the invention for a transportation system FIG. 4 represents a second power supply arrangement according to the invention for a transportation system FIG. 5 represents an elevator system according to the invention FIG. 6 represents power flow in an elevator system according to the invention.

FIG. 1*a* shows a representation 4, 4' according to the invention which is used for the estimation of instantaneous load capacity of a component 2. The component time to failure 5, 5', 5" and correspondingly the component recovery time 13, 13' are represented with respect to the current I 6, 6', 6", 6'", 6"" flowing through the component. Here the representation has been made for a so-called slow fuse, which is the type of fuse used for the interruption of overcurrent e.g. in the electricity connection of a building, but a corresponding representation 4 of time to failure 5, 5', 5" and/or a representation 4' of component recovery time 13, 13' can also be made for other power supply circuit components for which the time elapsing until component failure and/or recovery can be determined e.g. experimentally or on the basis of the material and/or thermal time constant of the component with respect to the electric quantity constituting a load on the component.

From characteristic 4 in FIG. 1*a* it can be seen that the time-to-failure 5, 5', 5" of the fuse 2 is reduced as the fuse current I 6, 6', 6" increases. This is due to the fact that the resistive thermal losses of the fuse increase as a function of its load current, leading to accelerated warming-up of the fuse.

When the fuse current is reduced, the time to failure again begins to increase correspondingly, and when the current falls below a given boundary value 15, the fuse finally begins to recover. The recovery time 13,13' is represented in FIG. 1*a* by a characteristic 4' similar to that for the time-to-failure 5, 5', 5". Here the recovery time is defined by negative values, whereas the time to failure is defined by values of positive sign. The recovery time is the shorter the smaller is the current load 6'", 6"" on the fuse, because the fuse will then cool down faster.

FIG. 1*b* represents the instantaneous load capacity 9, 9' of a slow fuse as a function of time t when the load capacity 9, 9' is estimated in the manner presented in the block diagram in FIG. 2. The instantaneous value 6, 6', 6", 6'", 6"" of the current flowing through the fuse is measured, and the measured current is low-pass filtered. The time-to-failure 5, 5', 5" of the fuse corresponding to the instantaneous value of the low-pass filtered current is determined from characteristic 4, and the recovery time 13, 13' of the fuse is determined from characteristic 4'. For the fuse time-to-failure 5, 5', 5" and fuse recovery time 13, 13' thus determined, an inverse value 16 is calculated repeatedly, and the calculated inverse value is integrated 10. In this embodiment of the invention, the integration is performed by summing the latest calculated value at one-second intervals to the integral value. The instantaneous load capacity of the fuse is determined as a relative value, so that value 1 corresponds to the highest instantaneous load capacity allowed for the fuse 2. The instantaneous load capacity 9 of the fuse is obtained by subtracting the calculated integral 10 of the inverse value from the standard value 1. The inverse values of the time-to-failure 5, 5', 5" that are included in the integration reduce the instantaneous load capacity 9, 9'; on the other hand, the inverse values of the fuse recovery time 13, 13' again correspondingly increase the instantaneous load capacity 9, 9' in conjunction with integration, because these inverse values of the recovery time are of negative sign.

The characteristic 4' for the fuse recovery time 13, 13' can also be replaced by a given standard value of recovery time, in which case the duration of recovery of the component is not determined quite as accurately but the calculation of instantaneous load capacity is simplified. In this case, using a safety margin, a recovery time is selected that is long enough to ensure that recovery from over-loading has taken place before the instantaneous load capacity of the component is restored to value 1.

In FIG. 1*b*, at instant t=0 the instantaneous load capacity 9 of the fuse is at a maximum, having the value of 1. After this, the current flowing through the fuse increases over the limit value 15, and at instant 7" indicated in FIG. 1*b* the fuse current is determined to have value 6". For the time-to-failure corresponding to this current value 6", value 5" is determined from characteristic 4 in FIG. 1*a*. At instant 7', the fuse current has value 6', and at instant 7 value 6, correspondingly. The time-to-failure 5, 5', 5" corresponding to each current value 6, 6', 6" is defined, and an inverse value is computed for the time-to-failure defined. The inverse value is integrated with respect to time and, based on the integral, the instantaneous load capacity 9 of the fuse is defined according to the block diagram in FIG. 2. From FIG. 1*b* it can be seen that, as the fuse current increases, the instantaneous load capacity 9 begins to fall faster. If the fuse is further operated under a large current load, the instantaneous load capacity 9 would finally fall to zero, in which case the fuse might be blown. For this reason, the current flowing through the fuse should be restricted before the instantaneous load capacity falls to zero, by using a safety margin 24 as indicated in FIG. 1*b*. The fuse current is thus restricted to a value below the limit current value 15 indicated in FIG. 1*a*. As the current becomes restricted, the fuse begins to recover and its instantaneous load capacity begins to rise. This increase in instantaneous load capacity is indicated by the broken line 9' in FIG. 1*b*. At instant 7'", the fuse current reaches value 6'", and the corresponding recovery time 13 is determined from characteristic 4'. At instant 7"", the fuse current has been further reduced, and the required recovery time 13' is therefore also shorter. As the fuse current is further reduced and the recovery time becomes shorter, the instantaneous load capacity 9' of the fuse computed according to the block diagram in FIG. 2 also begins to increase faster.

FIG. 3 represents a transportation system power supply arrangement with an arrangement according to the invention fitted in it for protecting a fuse 2 in the power supply 17. The power supply circuit 1 of the transportation system includes a controllable frequency converter 18, which has been adapted to supply power from an electricity network 17 to the motor 20 driving the transport apparatus under control of the frequency converter. Connected to the intermediate circuit of the frequency converter is a controllable three-phase mains inverter 21, which has been adapted to feed power returning from the motor 20 during motor braking further into the phases of the electricity network 17 under control of the power inverter. Fitted in each one of the three phases of the power supply 17 is a fuse 2 to be protected.

The arrangement comprises estimation of the load capacity of the fuse 2. The instantaneous load capacity 9, 9' of the fuse is estimated e.g. in the manner described in the embodiment examples represented by FIGS. 1*a*, 1*b* and 2. The load current of each of the three power supply phases is determined indirectly on the basis of measurement of the intermediate circuit current of the frequency converter, and therefore a separate measurement of the fuse current in not necessarily needed. The current flowing through each fuse 2 of the power supply is adapted to be limited to a certain limit current value 12, and this limit current value is determined on the basis of the estimated load capacity 9, 9' of the fuse 2. When the instantaneous load capacity 9, 9' of the fuse is reduced to a level close to zero, the fuse current is limited to a value below the limit current value 15 shown in FIG. 1*a*, whereupon the fuse 2 begins to recover from over-loading. The aforesaid limit current value 15 may be e.g. equal to the nominal current of the fuse.

Connected to the intermediate circuit of the frequency converter 18, between the positive 19 and negative 19' intermediate circuit rails, is a series circuit of a power resistor 14 and a controllable switch 22. Power exceeding the limited current handling capacity of the fuse 2 during motor braking of the electric motor 20 has been adapted to be consumed in the aforesaid power resistor 14.

The transportation system power supply arrangement presented in FIG. 4 differs from the arrangement presented in FIG. 3 in that here the controllable 11 mains inverter 21 fitted between the intermediate circuit of the frequency converter 18 and the electricity network 17 is a single-phase device. In this case, the mains inverter is connected to only one of the three phases of the electricity network. During motor braking of the motor 20 driving the transportation apparatus, the power returning to the frequency converter is thus transferred via the mains inverter 21 to that electricity network phase to which the mains inverter 21 is connected. Since the mains inverter current also flows through the corresponding electricity network fuse 2, the fuse in this phase is subjected to the highest current load. When the said fuse is to be protected e.g. by determining the instantaneous load capacity of the fuse in the manner described in the embodiment examples of FIGS. 1*a*, 1*b* and 2, the current to be sustained by the fuse 2 being protected can be restricted to a certain limit current value e.g. by using an arrangement such that, when the instantaneous load capacity 9, 9' of the fuse is reduced close to zero, the fuse current is limited to a value below the nominal current of the fuse. In this way, the aforesaid fuse 2 can be momentarily subjected to a current load exceeding the nominal current. The power supply range of the single-phase mains inverter 21 can thus be substantially extended, and it is consequently possible in many applications to replace a three-phase mains inverter with a single-phase solution.

FIG. 5 represents an elevator system in which the supply of power to the elevator motor 20 is adjusted by means of a frequency converter 18. When the force exerted by the elevator motor 20 is acting against the direction of motion of the elevator car 23, power returns from the elevator motor 20 to the frequency converter 18. From the intermediate circuit of the frequency converter, the power is transferred by a single-phase mains inverter 21 further to the electricity network 17. Thus, the power supply arrangement draws power from the electricity network 17 in a three-phase manner, whereas the power produced during motor braking is returned to only one of the phases of the electricity network, which is why the said phase receiving the returned power is subjected to a greater load than the other phases.

The power returned to the electricity network 17 also flows through the power supply fuse 2, and consequently the fuse in the electricity network phase connected to the mains inverter 21 is subjected to a greater load than the fuses in the other phases. For this reason, the elevator system is provided with an arrangement according to the invention for protecting a power supply fuse. The instantaneous load capacity of the fuse in the aforesaid electricity network 17 phase connected to the mains inverter 21 is determined e.g. in the manner described in the embodiment examples of FIGS. 1*a*, 1*b* and 2. The current supplied by the mains inverter 21 into the electricity network 17 is limited to a limit value 12 defined on the basis of the estimated load capacity 9, 9' of the said fuse 2. In this way, an overload exceeding the nominal current of the fuse can be momentarily fed through the fuse being protected, and the power supply can be implemented using a single-phase mains inverter 21 instead of a three-phase device. Fitted in conjunction with the main current circuit of the frequency converter 18 is also a power resistor 14, and the power supplied through this resistor is controlled by means of a separate switch. If the instantaneous power returning from the electric motor 20 to the frequency converter 18 exceeds the power handling capacity of the power supply fuse 2, then the extra braking power is converted into heat in the power resistor 14.

FIG. 6 visualizes power flow in an elevator system according to FIG. 5 during an elevator run. In this example, the elevator travels in the light direction, so the direction of motion of the elevator car is opposite to the force exerted by the elevator motor and, except for the initial acceleration, the elevator motor operates in the motor braking mode. In this situation, the mains inverter 21 feeds power from the frequency converter's intermediate circuit into the electricity network 17. The figure also shows the afore-mentioned limit value 12 set for the current flowing through the electricity supply fuse 2. The shaded area exceeding the current limit represents the braking power dissipated in the power resistor 14 during motor braking.

In an embodiment of the invention, the motion of the transportation apparatus 23, such as the velocity, acceleration and/or deceleration of the elevator car, is limited in accordance with the estimated load capacity 9, 9' of the electricity supply fuse 2.

The invention is not exclusively limited to the above-described embodiment examples, but many variations are possible within the scope of the inventive concept defined in the claims.

The component failure time and/or recovery time may be affected e.g. by ambient temperature and possible cooling of the component.

The motor driving the transportation apparatus may be a rotary motor or also a linear motor, in which case the movable rotor may be attached directly to the transportation apparatus.

Some of the power returning to the frequency converter during motor braking may also be utilized for satisfying the power requirement of the electrification of the transportation system.

The magnitude of the power flow from the motor driving the transportation apparatus into the frequency converter's intermediate circuit can also be determined e.g. on the basis of measurements of motor current and/or voltage.

The invention claimed is:

1. A method for protecting a component in a power supply circuit, the method comprising:

repeatedly determining an electric quantity acting on the component while the component is exposed to a load;

estimating an instantaneous load capacity of the component by repeatedly calculating an inverse of a limitation criteria value corresponding to the determined electric quantity and integrating the inverse value, where the limitation criterion value corresponding to the determined electric quantity is repeatedly derived from a representation that indicates with respect to the electric quantity the longest possible operating time of the component under a given loading condition while the component is exposed to the load; and limiting the actual current flowing through the component in the power supply circuit to a given boundary current value. said boundary current value determined according to the estimated instantaneous load capacity of the component.

2. A method according to claim 1, wherein the estimation of instantaneous load capacity further comprises:

repeatedly calculating a second limitation criterion value corresponding to the determined electric quantity derived from a representation that indicates with respect to the electric quantity indicating the recovery time of the component under a given loading condition.

3. A method according to claim 1, wherein the current flowing through the component in the power supply circuit is limited to a given non-zero boundary current value if the instantaneous load capacity of the component deviates from an allowed range.

4. A method according to claim 1, wherein the aforesaid power supply circuit component is a fuse in the power supply to a building.

5. A transportation system comprising:

a power supply circuit of the transportation system; and a control unit for protecting a fuse in the power supply to the transportation system, the control unit configured to:

repeatedly determine the current flowing through the fuse while the fuse is exposed to a load;

estimate an instantaneous load capacity of the fuse by repeatedly calculating an inverse of a limitation criteria value corresponding to the determined current and integrating the inverse value, where the limitation criterion value corresponding to the determined current is repeatedly derived from a representation that indicates with respect to current flowing through the fuse, the longest possible operating time of the fuse under a given loading condition while the fuse is exposed to a load;

limit the fuse current to a given boundary current value, where boundary current value is determined according to the estimated instantaneous load capacity of the fuse; and a resistor connected to the power supply circuit of the transportation system.

wherein the control unit is further configured to have the power exceeding the limited current handling capacity of the fuse be consumed in the resistor connected to the power supply circuit of the transportation system.

6. A transportation system according to claim 5, wherein movement of the transportation apparatus is limited according to the estimated load capacity of the fuse.

7. An elevator system comprising:

a power supply circuitry;

a motor;

a resistor connected to the power supply circuitry: and a control unit for protecting a fuse in the power supply circuitry, the control unit configured to:

repeatedly determine the current flowing through the fuse while the fuse is exposed to a load;

estimate an instantaneous load capacity of the fuse by repeatedly calculating an inverse of a limitation criteria value corresponding to the determined current and integrating the inverse value, where the limitation criterion value corresponding to the determined current is repeatedly derived from a representation that indicates with respect to current flowing through the fuse, the longest possible operating time of the fuse under a given loading condition while the fuse is exposed to a load; and limit the fuse current to a given boundary current value, where boundary current value is determined according to the estimated instantaneous load capacity of the fuse wherein the control unit is further configured to have the power exceeding the limited current handling capacity of the fuse be consumed in the resistor connected to the power supply circuitry.

8. An elevator system according to claim 7, wherein the control unit is further configured to transmit data indicating the instantaneous load capacity of the component in the power supply circuit of the elevator system to an elevator maintenance center.

* * * * *